United States Patent
Markle et al.

(10) Patent No.: US 7,502,702 B1
(45) Date of Patent: Mar. 10, 2009

(54) METHOD AND APPARATUS FOR DYNAMIC ADJUSTMENT OF SENSOR AND/OR METROLOGY SENSITIVITIES

(75) Inventors: Richard J. Markle, Austin, TX (US); Christopher A. Bode, Austin, TX (US); Kevin R. Lensing, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 184 days.

(21) Appl. No.: 11/221,078

(22) Filed: Sep. 7, 2005

(51) Int. Cl.
*G01D 18/00* (2006.01)

(52) U.S. Cl. ............... 702/81; 702/97; 702/155; 702/185; 702/85; 700/108; 700/110; 700/121

(58) Field of Classification Search ............... 702/81, 702/82, 83, 85, 97, 118, 119, 121, 155, 185; 438/14, 17, 18; 700/108, 110, 121, 179, 700/254
See application file for complete search history.

(56) References Cited

U.S. PATENT DOCUMENTS

| | | | |
|---|---|---|---|
| 5,840,448 A * | 11/1998 | Borodovsky et al. ......... 430/5 |
| 6,411,378 B1 * | 6/2002 | Pike ........................ 356/237.5 |
| 6,654,698 B2 * | 11/2003 | Nulman ....................... 702/85 |
| 6,673,638 B1 * | 1/2004 | Bendik et al. ................. 438/14 |
| 6,721,616 B1 * | 4/2004 | Ryskoski .................... 700/108 |
| 7,062,411 B2 * | 6/2006 | Hopkins et al. ............. 702/185 |
| 2003/0097198 A1 * | 5/2003 | Sonderman et al. ......... 700/110 |
| 2004/0121495 A1 * | 6/2004 | Sonderman et al. .......... 438/14 |
| 2005/0021272 A1 * | 1/2005 | Jenkins et al. .............. 702/105 |
| 2006/0058979 A1 * | 3/2006 | Markle et al. ............... 702/155 |
| 2007/0050749 A1 * | 3/2007 | Ye et al. ...................... 716/20 |

OTHER PUBLICATIONS

60713123.*

* cited by examiner

*Primary Examiner*—Carol S Tsai
(74) *Attorney, Agent, or Firm*—Williams, Morgan & Amerson

(57) ABSTRACT

The present invention provides a method and apparatus for dynamic adjustment of sensor and/or metrology sensitivities. The method includes accessing measurement information provided by a first measurement device and modifying a sensitivity of a second measurement device based on the measurement information provided by the first measurement device.

22 Claims, 3 Drawing Sheets

METHOD AND APPARATUS FOR DYNAMIC ADJUSTMENT OF SENSOR AND/OR METROLOGY SENSITIVITIES

BACKGROUND OF THE INVENTION

1. Field of the Invention

This invention relates generally to semiconductor fabrication, and, more particularly, to dynamic adjustment of sensor and/or metrology sensitivities during semiconductor fabrication.

2. Description of the Related Art

Advanced process control (APC) systems are often used to coordinate operation of processing tools used to fabricate semiconductor devices. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer.

The APC system typically includes devices for collecting data indicative of the physical and/or chemical state of the processing tool before, during, and/or after processing by the processing tools. The collected data indicative of the physical and/or chemical state of the processing tool is commonly referred to as process state information. For example, the process state information may include information indicative of abundances, concentrations, and/or mass-to-charge ratios associated with chemical species used in the processing tool. For another example, the process state information may include information indicative of one or more radiofrequency powers, spin speeds, pressures, and/or temperatures used in the processing tool. Process state information may be determined using data collected by a variety of well-known measurement devices including, but not limited to, optical emission spectroscopy devices, residual gas analyzers, mass spectrometers, and Fourier transform infrared devices.

The APC system may also include a variety of devices for collecting data indicative of the physical state of one or more wafers before, during, and/or after processing by the processing tools. The collected data indicative of the physical state of the wafer is commonly referred to as wafer state data. The collected wafer state data may be provided to the APC system, which may use the collected wafer state data to characterize the wafer and/or to detect faults associated with the processing. For example, a mean critical dimension associated with the various features may be indicative of a performance level of devices formed on the wafer and/or the wafer lot. If the wafer state data indicates that the mean critical dimension associated with the feature, e.g., a gate electrode feature, is on the lower end of an allowable range for such feature sizes, then this may indicate that the device formed on the wafer may exhibit relatively high performance levels. Higher performance devices may be sold at a higher price, thereby increasing the profitability of the manufacturing operation. However, the wafer state data may indicate that devices formed on the wafer and/or wafer lot have a relatively low performance level or are faulty if the mean critical dimension is near an upper end of the allowable range or falls outside of the allowable range.

Wafer state data may be collected by sensors incorporated within a processing tool, such as scatterometers, ellipsometers, and the like, in which case the wafer state data is referred to as in situ wafer state data. The in situ wafer state data may include measurements of a temperature of the wafer, a thickness of a layer of material formed above the wafer, a critical dimension of a feature formed above the wafer, or other characteristic parameters. Wafer sampling by the in situ sensors can increase the time spent by the wafer in the processing tool and so, in order to maintain a desired throughput, sensors usually perform gross metrology in which a small and/or isolated region on each wafer is sampled with relatively low sensitivity.

Wafer state data may also be collected by devices external to the processing tool, in which case the wafer state data is referred to as ex situ wafer state data. The ex situ wafer state data may include a thickness of a layer formed above the wafer, a critical dimension (CD) of a feature formed above the wafer, and the like. For example, an integrated metrology tool, i.e. a metrology tool that is coupled to a processing tool, may be used to collect ex situ wafer state data from a subset of the wafers that have been processed in the processing tool. Relative to sensors included within the processing tool, integrated metrology tools typically operate at a higher sensitivity and so perform higher accuracy measurements and/or measurements at a higher granularity. However, at least in part to maintain a desired throughput, the integrated metrology tools perform these measurements on a smaller number of wafers and/or on a smaller area on the wafer. For another example, a stand-alone metrology tool, i.e. a metrology tool that is physically separate from the processing tools, may be used to collect ex situ wafer state data from a subset of the wafers that have been processed in the processing tool. Compared to integrated metrology tools, stand-alone metrology tools typically operate at a higher sensitivity and so perform higher accuracy and/or higher granularity measurements, but on a smaller number of wafers and/or on a smaller area of the wafer.

Sensitivities of metrology tools are typically determined prior to beginning a fabrication run and may only be changed by interrupting the run and manually changing the sensitivity. Using predetermined metrology sensitivities may limit the ability of the advanced process control system to control the quality of the fabricated semiconductor devices. The predetermined metrology sensitivities may also limit the ability of the advanced process control system to track, analyze, and/or diagnose causes of killer defects. Moreover, changing the sensitivities manually may reduce the efficiency and/or throughput of the advanced process control system.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, an apparatus is provided for dynamic adjustment of sensor and/or metrology sensitivities. The apparatus includes at least one processing tool and first and second measurement devices. The apparatus also includes a sensitivity controller for accessing measurement information provided by the first measurement device and modifying a sensitivity of the second measurement device based on the measurement information provided by the first measurement device.

In another embodiment of the present invention, a method is provided for dynamic adjustment of sensor and/or metrology sensitivities. The method includes accessing measurement information provided by a first measurement device and modifying a sensitivity of a second measurement device based on the measurement information provided by the first measurement device.

BRIEF DESCRIPTION OF THE DRAWINGS

The invention may be understood by reference to the following description taken in conjunction with the accompanying drawings, in which like reference numerals identify like elements, and in which.

Figure 1:
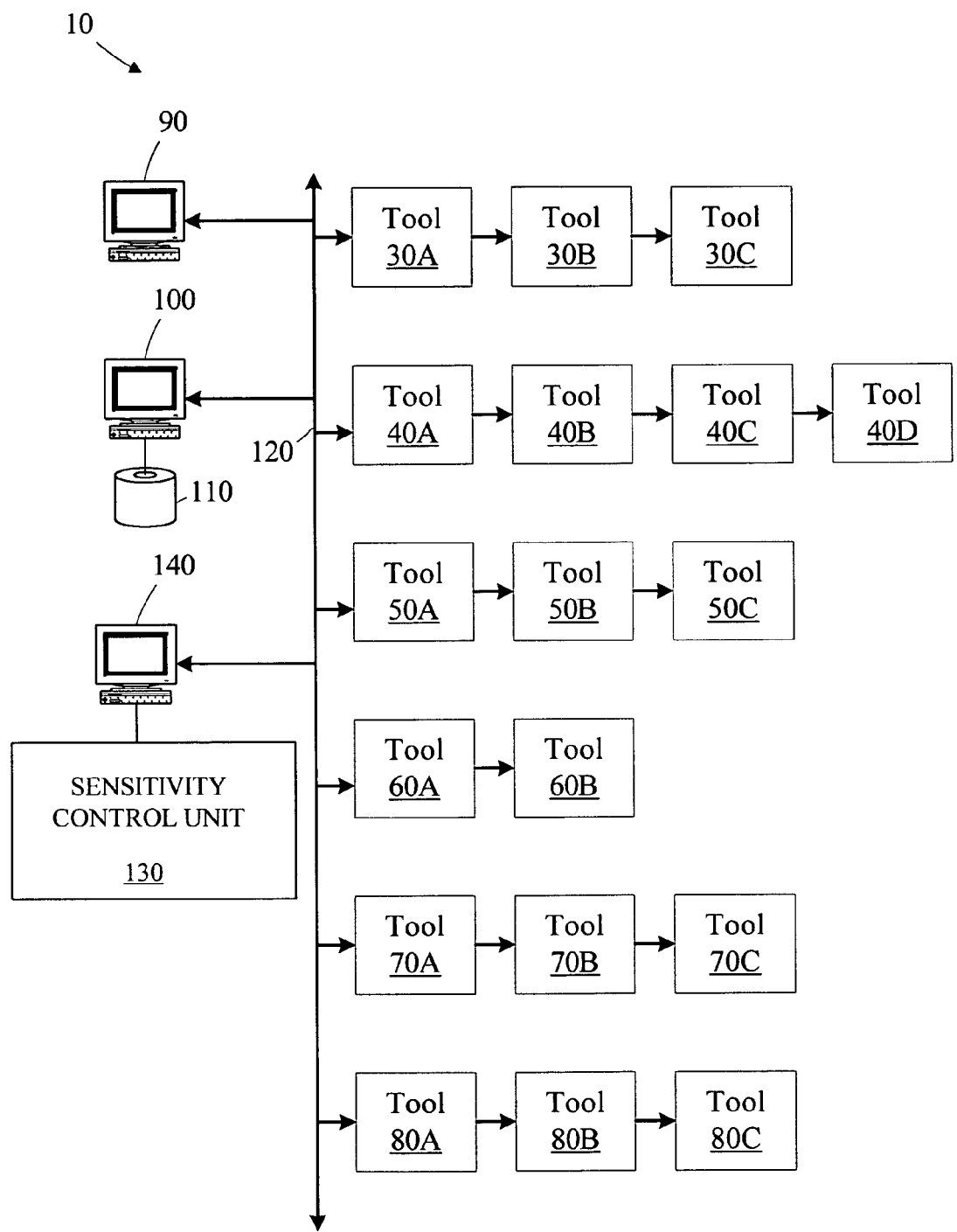
FIG. 1 shows a simplified block diagram of an illustrative manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 shows a simplified block diagram of an illustrative manufacturing system 10. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other similar devices. The techniques may also be applied to workpieces or manufactured items other than semiconductor devices.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI)

Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif. However, persons of ordinary skill in the art should appreciate that the present invention is not limited to the Catalyst APC system. In alternative embodiments, any desirable information exchange and process control framework may be used without departing from the scope of the present invention.

The manufacturing system 10 includes a plurality of tools 30-80. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, and the like The tools 30-80 are depicted in a rank and file grouping for illustrative purposes only. In an actual implementation, the tools 30-80 may be arranged in any physical order or grouping.

A manufacturing execution system (MES) server 90 directs high level operation of the manufacturing system 10. The MES server 90 monitors the status of the various entities in the manufacturing system 10 (i.e., wafer lots, tools 30-80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool state information, process state information, lot priorities, and the like. The processing and data storage functions are distributed amongst the different computers or workstations in FIG. 1 to provide general independence and central information storage. However, persons of ordinary skill in the art should appreciate that different numbers of computers and different arrangements may be used without departing from the scope of the instant invention.

A network 120 interconnects various components of the manufacturing system 10, such as the tools 30-80 and the servers 90, 100, allowing them to exchange information. In one embodiment, each of the tools 30-80 is coupled to a computer (not shown) for interfacing with the network 120. Additionally, the connections between the tools 30-80 in a particular grouping are meant to represent connections to the network 120, rather than interconnections between the tools 30-80. In various alternative embodiments, the network 120 may be an Internet, intranet, or any other desirable type of network. Persons of ordinary skill in the art should appreciate that the network 120 may include a variety of routers, hubs, switches, connectors, interfaces, cables, wires, and the like that are not shown in FIG. 1.

A sensitivity control unit 130 is coupled to the network 120. In the illustrated embodiment, the sensitivity control unit 130 is implemented in a computer 140, which may be coupled to the network 120 in any desirable manner. As will be discussed in detail below, in one embodiment, the sensitivity control unit 130 accesses measurement information provided by a measurement device, such as a sensor or an in situ metrology tool within one or more of the tools 30-80, an integrated metrology tool, or a stand-alone metrology tool. The sensitivity control unit 130 may then modify a sensitivity of a different measurement device based on the measurement information, as will be discussed in detail below.

Figure 2:
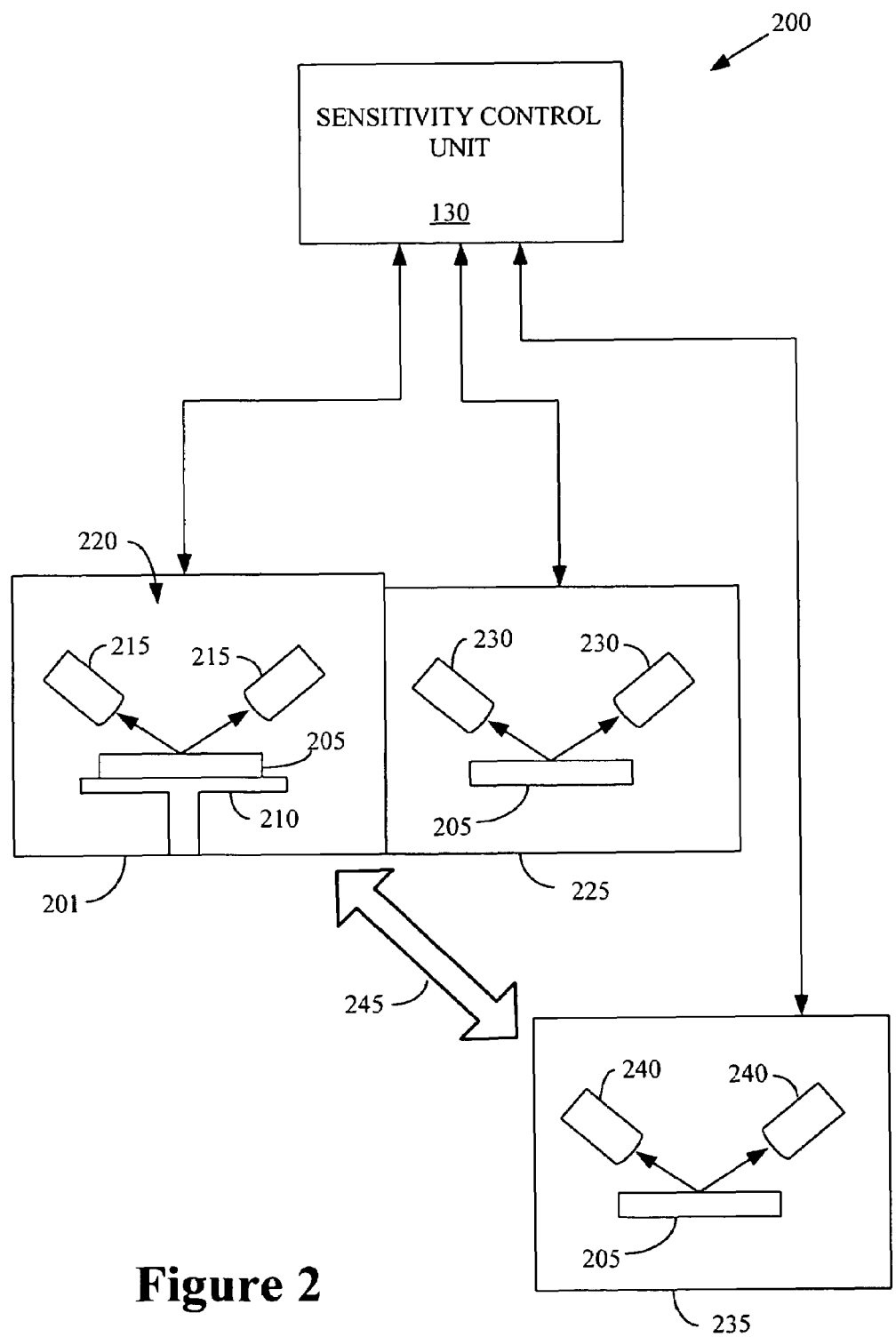
FIG. 2 conceptually illustrates an exemplary embodiment of a portion of a manufacturing system including a processing tool that is communicatively coupled to a sensitivity control unit, in accordance with the present invention.

FIG. 2 conceptually illustrates an exemplary embodiment of a portion of a manufacturing system 200 including a processing tool 201 that is communicatively coupled to the sensitivity control unit 130. Exemplary processing tools 201 include, but are not limited to, deposition tools, photolithography tools, etching tools, ion implantation tools, and polishing tools. In the illustrated embodiment, the processing tool 201 includes a wafer 205 disposed upon a platform or wafer stage 210. Although a single wafer 205 is shown in FIG. 2, persons of ordinary skill in the art should appreciate that the wafer 205 may be representative of a plurality of wafers and/or a wafer lots. Persons of ordinary skill in the art should also appreciate that the processing tool 201 may include other components not shown in FIG. 2. For example, the processing tool 201 may include various power connections and/or valves to control the flow of various process gases. In the interest of clarity, only those components of the processing tool 201 that are relevant to the present invention will be discussed herein.

The processing tool 201 may provide tool state information to the sensitivity control unit 130. As used herein, the term "tool state information" refers to information that is indicative of a processing state associated with the processing tool 201. The specific type and/or content of the tool state information provided by the processing tool 201 may depend upon the type of tool and/or the process being carried out by the processing tool 201. For example, tool state information provided by a spin-on deposition tool 201 may include a spin speed of the platform 210, a quantity of material deposited on the wafer 205, and the like. For another example, tool state information provided by a photolithography tool 201 may include a thickness of a masking layer, an exposure time and/or dose, and the like. For yet another example, tool state information provided by an etching tool 201 may include a gas flow rate, an exhaust rate, a radiofrequency power, and the like. However, persons of ordinary skill in the art should appreciate that these examples of tool state information are intended to be illustrative and not to limit the present invention.

One or more measurement devices 215 may be deployed within the processing tool 201. In one embodiment, the measurement devices 215 include one or more sensors for determining process state information. As used herein, the phrase "process state information" refers to information indicative of the physical and/or chemical state in the processing tool 201. In various alternative embodiments, process state information includes information indicative of a chemistry associated with an etching process, a polishing process, a chemical bath, and the like. For example, the process state information may include information indicative of abundances, concentrations, mass-to-charge ratios, slurry concentrations, and/or slurry pHs associated with chemical species used in the etching process, the polishing process, and/or the chemical bath. For another example, the process state information may include information indicative of one or more pressures and/or or temperatures. Process state information may be determined using data collected by a variety of well-known sensors including, but not limited to, optical emission spectroscopy devices, residual gas analyzers, mass spectrometers, and Fourier transform infrared devices. The measurement device 215 may provide the process state information to the sensitivity control unit 130.

The measurement devices 215 may also include one or more in situ metrology tools, such as scatterometers, ellipsometers, reflectometers, and the like, which may measure and provide wafer state data to the sensitivity control unit 130. In various alternative embodiments, the wafer state data may include one or more of a defect density, a killer defect density, a critical dimension, a profile, a pattern integrity, a film thickness, a film optical property, a resistivity, a dopant concentration, and an overlay error. However, persons of ordinary skill in the art should appreciate that the present invention is not limited to these particular examples of wafer state data. In alternative embodiments, any type and/or content of wafer state data may be used.

The manufacturing system 200 may also include one or more ex situ wafer metrology tools, such as an integrated metrology tool 225 and/or a stand-alone metrology tool 235. The metrology tools 225, 235 include one or more wafer measurement devices 230, 240, respectively, for collecting wafer state data. The wafer measurement devices 230, 240 may include scatterometers, ellipsometers, reflectometers, Fourier Transform Infrared (FTIR) devices, optical scan devices, and the like. Moreover, the present invention is not limited to any particular number of wafer measurement devices 230, 240. In alternative embodiments, the metrology tools 225, 235 may include more or fewer wafer measurement devices 230, 240 than are shown in FIG. 2.

The wafer 205 (or one or more wafer lots including the wafer 205) may be provided to the processing tool 201, the integrated metrology tool 225, and/or the stand-alone metrology tool 235 (as indicated by the arrow 245) in any desirable order. In one embodiment, the wafer 205 is transferred from the processing tool 201 to one or both of the metrology tools 225, 235 substantially after processing is complete. However, the present invention is not limited to transferring the wafer 205 to the metrology tools 225, 235 after processing in the processing tool 201 is complete. In one alternative embodiment, the wafer 205 is transferred from the processing tool 201 to one or both of the metrology tools 225, 235 between processing steps carried out by the processing tool 201.

In various alternative embodiments, the processing tool 201, the sensors 215, the integrated metrology tool 225, and/or the stand-alone metrology tool 235 may determine wafer state data, tool state information, and/or process state information at a selected sensitivity. For example, the processing tool 201, the sensors 215, the integrated metrology tool 225, and/or the stand-alone metrology tool 235 may each perform measurements at a predetermined, or nominal, sensitivity. The nominal sensitivities may be determined using any criterion and may vary for the different measurement devices. In one embodiment, the nominal sensitivities may be provided as a part of a metrology recipe. The wafer state data, tool state information, and/or process state information collected at the predetermined, or nominal, sensitivity may be provided to the sensitivity control unit 130.

The sensitivity control unit 130 can modify the sensitivities of one or more of the measurement devices 201, 215, 225, 230, 235, 240 based upon the provided wafer state data, tool state information, and/or process state information. In one embodiment, the sensitivity control unit 130 modifies the sensitivity of one of the measurement devices 201, 215, 225, 230, 235, 240 based upon wafer state data, tool state information, and/or process state information associated with a different one of the measurement devices 201, 215, 225, 230, 235, 240. The modified sensitivities may be provided to the appropriate measurement device(s) 201, 215, 225, 230, 235, 240 as a part of a metrology recipe. Persons of ordinary skill in the art should appreciate that, in alternative embodiments, the sensitivity control unit 130 may modify the sensitivities of a plurality of the measurement devices 201, 215, 225, 230, 235, 240 based upon wafer state data, tool state information, and/or process state information associated with one or more measurement devices 201, 215, 225, 230, 235, 240.

Operation of the sensitivity control unit 130 will now be discussed in the context of two exemplary embodiments in which the sensitivity of a first measurement device is modified based upon information provided by a second measurement device. However, it should be appreciated that the sensitivity control unit 130 can use any criteria to determine modifications to sensitivities of the measurement devices. Moreover, as discussed above, the sensitivity control unit 130 can modify sensitivities of any measurement devices based upon information provided by any of the other measurement devices. Thus, persons of ordinary skill in the art having benefit of the present disclosure should appreciate that these examples are merely illustrative and not intended to limit the present invention.

In the first exemplary embodiment, the sensitivity control unit 130 controls measurement sensitivities of the sensors 215 and the integrated metrology tool 225. Process and/or tool state information collected by one or more of the sensors 215 may be indicative of an expected density of defects detected by the integrated metrology tool 225. If the process and/or tool state information is within an allowable range, the expected density of defects detected by the integrated metrology tool 225 may be small. The sensitivity control unit 130 may then increase the sensitivity of the integrated metrology tool 225. For example, the sensitivity of the integrated metrology tool 225 may be increased from ½ of a nanometer to ¹⁄₁₀ of a nanometer at approximately the same signal-to-noise ratio. Alternatively, if the process and/or tool state information is not within an allowable range, the expected density of defects detected by the integrated metrology tool 225 may be large and the sensitivity control unit 130 may reduce the sensitivity of the integrated metrology tool 225. For example, the sensitivity of the integrated metrology tool 225 may be reduced so that only killer defects are detected when a spin rate and/or exhaust rate of a deposition tool indicate that splash back may be occurring.

Wafer state data collected by the integrated metrology tool 225 may also be used to modify the sensitivity of one or more of the sensors 215. For example, wafer state data collected by the integrated metrology tool 225 may indicate a relatively large number of killer defects in wafers processed in the processing tool 201. If the killer defects are known to be correlated with a particular process state or tool state, the sensitivity control unit 130 may decrease the sensitivity of one or more sensors 215 that monitor these process states and/or tool states so that only relatively large deviations in the process and/or tool state that may result in a killer defect are detected. For another example, wafer state data collected by the integrated metrology tool 225 may indicate a relatively small number of defects in wafers processed in the processing tool 201. In that case, the sensitivity control unit 130 may increase the sensitivity of one or more sensors 215 to improve control, e.g., run-to-run control by an advanced process control system, of some aspect of processing by the processing tool 201.

In the second exemplary embodiment, the sensitivity control unit 130 controls measurement sensitivities of the integrated metrology tool 225 and the stand-alone metrology tool 235. Accordingly, the sensitivity control unit 130 may modify a measurement sensitivity of the integrated metrology tool 225 and/or the stand-alone metrology tool 235 if one or more measurements are outside of a baseline measurement. For example, if measurements by the stand-alone metrology tool 235 indicates that processed wafers have a low defect density and/or few killer defects, the sensitivity of the integrated metrology tool 225 may be increased (perhaps to a maximum sensitivity) to attempt to drive the defect density even lower. For another example, if the stand-alone metrology tool 235 detects a relatively large defect density and/or number of killer defects, the sensitivity of the integrated metrology tool 225 may be decreased so that only large and/or killer defects are detected. The sampling rate of the integrated metrology tool 225 may also be increased, e.g., to a sampling rate of approximately 100%.

Alternatively, if measurements by the integrated metrology tool 225 indicate that wafer state parameters associated with processed wafers have drifted outside an allowable or desirable range, the sensitivity of the stand-alone metrology tool 235 may be increased, perhaps to a maximum sensitivity. For example, if the integrated metrology tool 225 detects a change in a critical dimension, a profile, and/or a pattern integrity associated with processed wafers, the sensitivity control unit 130 may instruct the stand-alone scanning electron microscope to increase an extraction voltage to more accurately measure wafer state profiles, i.e., the sensitivity control unit 130 may increase the sensitivity of the stand-alone scanning electron microscope.

Figure 3:
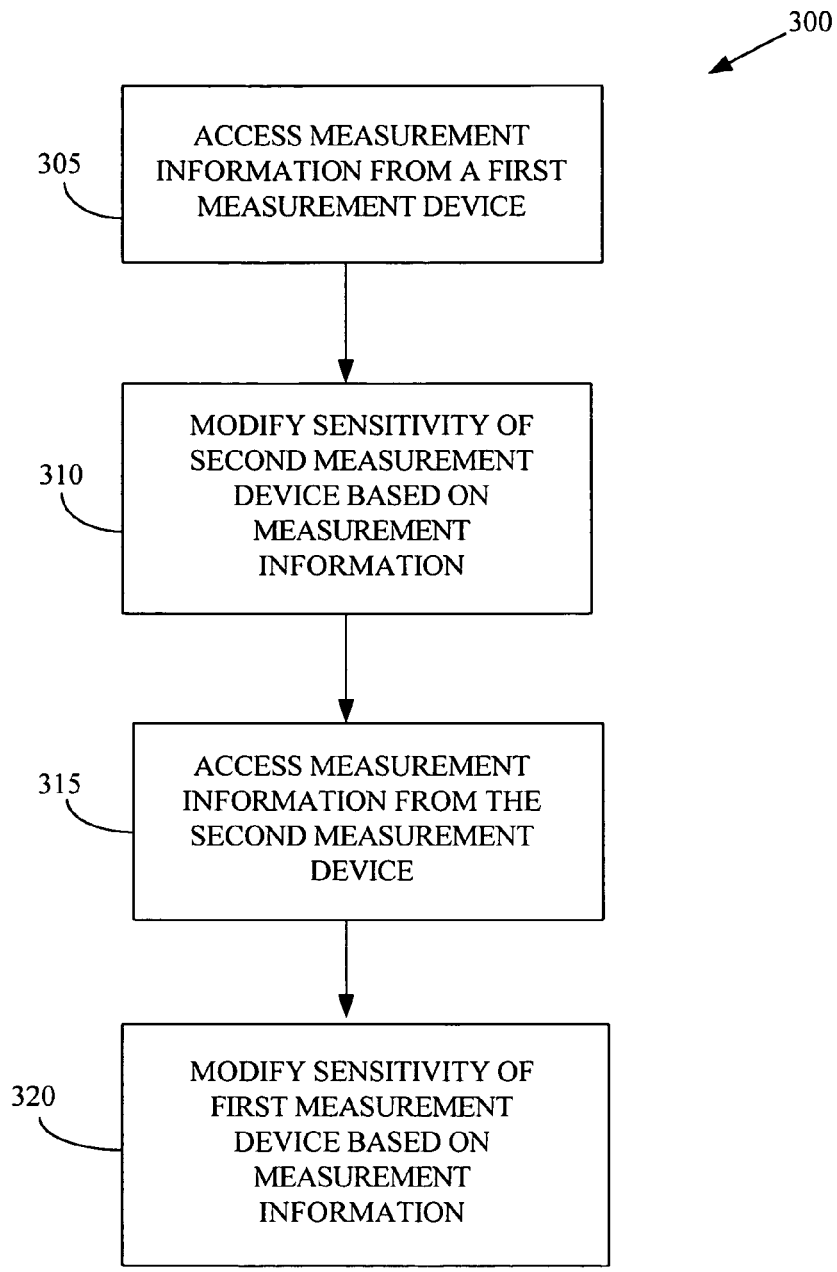
FIG. 3 conceptually illustrates one exemplary embodiment of the method of integrating information collected by measurement devices for dynamic adjustment of sensitivities, in accordance with the present invention.

FIG. 3 conceptually illustrates one exemplary embodiment of a method 300 of integrating information collected by measurement devices for dynamic adjustment of sensitivities. In the illustrated embodiment, measurement information from one or more first measurement devices is accessed (at 305). A sensitivity of one or more second measurement devices is then modified (at 310) based upon the measurement information, as discussed in detail above. Although not necessary for the practice of the present invention, measurement information from one or more of the second measurement devices may also be accessed (at 315) and one or more sensitivities of one or more of the first measurement devices may be modified (at 320) based upon the measurement information from one or more of the second measurement devices.

By integrating information collected by measurement devices such as the processing tool 201, the sensors 215, the integrated metrology tool 225, and the stand-alone metrology tool 235 shown in FIG. 2, sensitivities of these measurement devices may be adjusted in concert to maximize control of the semiconductor fabrication system 100. The improved control of the semiconductor fabrication system 100 provided by integrated sensitivity control, as discussed above, may reduce defect densities, reduce the number of killer defects, and improve control of parameters such as critical dimensions, film thicknesses, overlay errors, and the like. Moreover, the number of interruptions in processing required to change the sensitivities manually may be reduced, thereby improving the efficiency and/or throughput of the advanced process control system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    accessing measurement information provided by a first measurement device in response to performing a at least one measurement on at least one processed wafer;
    modifying a sensitivity of a second measurement device from a first sensitivity to a second sensitivity based on the measurement information provided by the first measurement device, wherein the first sensitivity indicates that the second measurement device can detect defects in said at least one processed water on a first length scale, and wherein the second sensitivity indicates that the second measurement device can detect defects in said at least one processed water on a second length scale different than the first length scale; and
    performing at least one measurement on said at least one processed wafer at the second sensitivity using the second measurement device.

2. The method of claim 1, wherein accessing the measurement information comprises accessing measurement information associated with a processing tool used to process said at least one processed wafer.

3. The method of claim 2, wherein modifying the sensitivity of the second measurement device comprises modifying a sensitivity of a second measurement device associated with the processing tool when the measurement information provided by the first measurement device is outside an allowable range indicating that an expected density of defects on said at least one processed wafer is large.

4. The method of claim 1, wherein accessing the measurement information comprises accessing at least one of wafer state data, tool state information, and process state information, and wherein modifying the sensitivity of the second measurement device comprises changing the first sensitivity to the second sensitivity when at least one of the wafer state data, tool state information, or process state information is outside of an allowable range.

5. The method of claim 4, wherein accessing the measurement information comprises accessing at least one of a defect density, a killer defect density, a critical dimension, a profile, a pattern integrity, a film thickness, a film optical property, a resistivity, a dopant concentration, and an overlay error.

6. The method of claim 4, wherein accessing the measurement information comprises accessing information indicative of at least one of a pressure, a temperature, an abundance of a chemical species, a concentration of the chemical species, a mass-to-charge ratio of the chemical species, a slurry concentration, and a slurry pH.

7. The method of claim 4, wherein accessing the measurement information comprises accessing at least one of a spin speed, a gas flow rate, an exhaust rate, a radiofrequency power, an ion flux, and a process duration.

8. The method of claim 1, wherein modifying the sensitivity of the second measurement device comprises increasing or decreasing the sensitivity of the second measurement device.

9. The method of claim 1, wherein modifying the sensitivity of the second measurement device comprises modifying a metrology recipe for the second measurement device to increase the sensitivity from the first sensitivity of $\frac{1}{2}$ of a nanometer to the second sensitivity of $\frac{1}{10}$ of a nanometer at approximately the same signal-to-noise ratio.

10. The method of claim 1, further comprising modifying a sampling rate associated with the second measurement device.

11. The method of claim 1, further comprising:
    accessing measurement information provided by the second measurement device; and modifying a sensitivity of the first measurement device based on the measurement information provided by at least the second measurement device.

12. An apparatus, comprising:

at least one processing tool configured to process at least one wafer;

first and second measurement devices configured to perform measurements on said at least one processed water at configurable sensitivities; and a sensitivity controller for accessing measurement information provided by the first measurement device and modifying a sensitivity of the second measurement device from a first sensitivity to a second sensitivity based on the measurement information provided by the first measurement device, wherein the first sensitivity indicates that the second measurement device can detect defects in said at least one processed wafer on a first length scale, and wherein the second sensitivity indicates that the second measurement device can detect defects in said at least one processed wafer on a second length scale different than the first length scale.

13. The apparatus of claim 12, wherein the first and second measurement devices are configured to determine measurement information associated with said at least one processing tool, and wherein the sensitivity controller is configured to change the first sensitivity to the second sensitivity when the measurement information is outside of an allowable range.

14. The apparatus of claim 12, wherein the first and second measurement devices each comprise at least one of a sensor, an in situ metrology tool, an integrated metrology tool, and a stand-alone metrology tool.

15. The apparatus of claim 14, wherein the first and second measurement devices are configured to determine at least one of a defect density, a killer defect density, a critical dimension, a profile, a pattern integrity, a film thickness, a film optical property, a resistivity, a dopant concentration, and an overlay error.

16. The apparatus of claim 14, wherein the first and second measurement devices are configured to determine information indicative of at least one of a pressure, a temperature, an abundance of a chemical species, a concentration of the chemical species, and a mass-to-charge ratio of a chemical species.

17. The apparatus of claim 14, wherein the first and second measurement devices are configured to determine at least one of a process temperature, a process pressure, a spin speed, a gas flow rate, an exhaust rate, a radiofrequency power, a slurry concentration, a slurry pH, a concentration of a chemical species, and a process duration.

18. The apparatus of claim 12, wherein the sensitivity controller is configured to increase a sensitivity of the second measurement device from the first sensitivity to a second sensitivity that is larger than the first sensitivity or decrease the sensitivity of the second measurement device from the first sensitivity to a second sensitivity that is lower than the first sensitivity.

19. The apparatus of claim 12, wherein the sensitivity controller is configured to modify a metrology recipe for the second measurement device to increase the sensitivity from the first sensitivity of $\frac{1}{2}$ of a nanometer to the second sensitivity of $\frac{1}{10}$ of a nanometer at approximately the same signal-to-noise ratio.

20. The apparatus of claim 12, wherein the sensitivity controller is configured to modify a sampling rate associated with the second measurement device.

21. The apparatus of claim 12, wherein the sensitivity controller is configured to:

access measurement information provided by the second measurement device; and modify a sensitivity of the first measurement device based on the measurement information provided by at least the second measurement device.

22. An apparatus, comprising:

means for accessing measurement information provided by a first measurement device in response to performing at least one measurement on at least one processed water; and means for modifying a sensitivity of a second measurement device from a first sensitivity to a second sensitivity based on the measurement information provided by the first measurement device, wherein the first sensitivity indicates that the second measurement device can detect defects in said at least one processed wafer on a first length scale, and wherein the second sensitivity indicates that the second measurement device can detect defects in said at least one processed wafer on a second length scale different than the first length scale; and means for performing at least one measurement on said at least one processed wafer at the second sensitivity using the second measurement device.

* * * * *